(12) United States Patent
Ko

(10) Patent No.: US 7,853,374 B2
(45) Date of Patent: Dec. 14, 2010

(54) APPARATUS FOR ALIGNMENT ADJUSTING OF RADAR EQUIPPED IN A VEHICLE

(75) Inventor: Bong-Chul Ko, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 805 days.

(21) Appl. No.: 11/821,021

(22) Filed: Jun. 21, 2007

(65) Prior Publication Data

US 2008/0147274 A1    Jun. 19, 2008

(30) Foreign Application Priority Data

Dec. 14, 2006    (KR)   ................ 10-2006-0127991

(51) Int. Cl.
*G01B 7/31*    (2006.01)
(52) U.S. Cl. ................ 701/29; 33/286; 33/288; 342/165
(58) Field of Classification Search ............... 701/29; 33/286, 288; 342/70, 165, 173, 174
See application file for complete search history.

(56) References Cited

U.S. PATENT DOCUMENTS

| | | | | |
|---|---|---|---|---|
| 4,945,622 A | * | 8/1990 | Kaibuki et al. | ............. 29/281.1 |
| 5,943,783 A | * | 8/1999 | Jackson | ..................... 33/288 |
| 6,020,844 A | * | 2/2000 | Bai et al. | ................. 342/165 |
| 6,329,952 B1 | | 12/2001 | Grace | |
| 6,335,705 B1 | * | 1/2002 | Grace et al. | ................ 343/703 |
| 6,363,619 B1 | * | 4/2002 | Schirmer et al. | ............ 33/288 |
| 6,418,775 B1 | * | 7/2002 | Sager et al. | ................. 73/1.79 |
| 6,437,731 B1 | * | 8/2002 | Henrio et al. | ............... 342/165 |
| 6,778,131 B2 | * | 8/2004 | Haney et al. | ................ 342/174 |
| 6,823,601 B2 | * | 11/2004 | Murray | ....................... 33/288 |
| 7,121,011 B2 | * | 10/2006 | Murray et al. | ................ 33/288 |
| 7,376,492 B2 | * | 5/2008 | Srack et al. | ..................... 701/1 |
| 7,458,165 B2 | * | 12/2008 | Rogers | .................... 33/203.18 |

FOREIGN PATENT DOCUMENTS

| | | |
|---|---|---|
| EP | 1260832 | 11/2002 |
| JP | 11-326495 | 11/1999 |
| JP | 2001-174540 | 6/2001 |
| JP | 2005-331353 | 12/2005 |

* cited by examiner

*Primary Examiner*—Thomas G Black
*Assistant Examiner*—Peter D Nolan
(74) *Attorney, Agent, or Firm*—Morgan, Lewis & Bockius LLP

(57) ABSTRACT

In a first embodiment, an apparatus includes a vehicle turning system; a vehicle moving system; a signal transmitting system with transmitters that measure, and generate signals corresponding to, the locations of two portions of the vehicle; a signal receiving system that receives the signals; and a control system that estimates the orientation of the vehicle, and controls the vehicle moving system and vehicle turning system. In a second embodiment, the apparatus includes a vehicle turning system; a laser system including a laser emitting a laser beam, a mirror attached to the vehicle, and a target plate to receive the laser beam from the mirror; an orientation detecting system including a transceiver with sensors attached to the vehicle, that generate signals, and a reflector that reflects the signals; and a control system that determines the orientation of the vehicle, and controls the vehicle turning system based on the orientation.

4 Claims, 6 Drawing Sheets

APPARATUS FOR ALIGNMENT ADJUSTING OF RADAR EQUIPPED IN A VEHICLE

CROSS-REFERENCE TO RELATED APPLICATIONS

The present application is based on, and claims priority from, Korean Application Serial Number 10-2006-0127991, filed on Dec. 14, 2006, the disclosure of which is hereby incorporated by reference herein in its entirety.

FIELD OF THE INVENTION

The present invention relates to an apparatus for alignment adjusting of a radar device in a vehicle.

BACKGROUND OF THE INVENTION

It is a current trend in vehicles to apply ACC (Adaptive Cruise Control) to detect the distance to a front vehicle. CDMs (Chassis Dynamometers) are also provided to vehicles to alarm a driver when a collision with the front vehicle is likely.

ACCs and CDMs typically use radar to detect vehicles in the front area. If the radar device is positioned incorrectly, even at a slight angle, its performance suffers. The radar devices are typically aligned using lasers. However, several problems arise from the use of lasers. For example, the front of the vehicle must be parallel with the surface on which the laser equipment is mounted and the central axes of the laser and the vehicle must be aligned, which is a difficult undertaking.

SUMMARY OF THE INVENTION

In a first embodiment, a vehicle turning system includes a vehicle support rail to support a vehicle, and a vehicle turning unit to rotate the vehicle. A vehicle moving system includes a support frame, a guide rail connected to the support frame, and a mover to move the vehicle support rail and the vehicle along the guide rail. A signal transmitting system includes first and second transmitters that measure locations of first and second portions of the vehicle, respectively, and generate signals corresponding to the positions. The signal transmitting system also includes an interval-regulating rail to regulate the distance between the first and second transmitters. A signal receiving system includes a central receiver mounted on the support frame, and first and second receivers mounted at either side of the central receiver. A control system estimates the orientation of the vehicle based on the signals, and controls the vehicle moving system and vehicle turning system to move the vehicle on the basis of the orientation.

The central receiver and the first receiver receive the signals from the first transmitter, and the central receiver and the second receiver receive the signals from the second transmitter.

In a second embodiment, a vehicle turning system is configured to rotate a vehicle disposed thereon. A laser system includes a laser emitting a laser beam, a mirror attached to the vehicle, and a target plate to receive the laser beam from the mirror. An orientation detecting system includes a transceiver having first and second sensors attached to first and second portions of the vehicle, respectively, that generate signals, and a reflector that reflects the signals. A control system receives the signals from the orientation detecting system, determines the orientation of the vehicle based on the signals, and controls the vehicle turning system based on the orientation.

The reflector includes first and second reflective plates to reflect the signals from the first and second sensors, respectively, and a third reflective plate to reflect the signal from the first sensor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
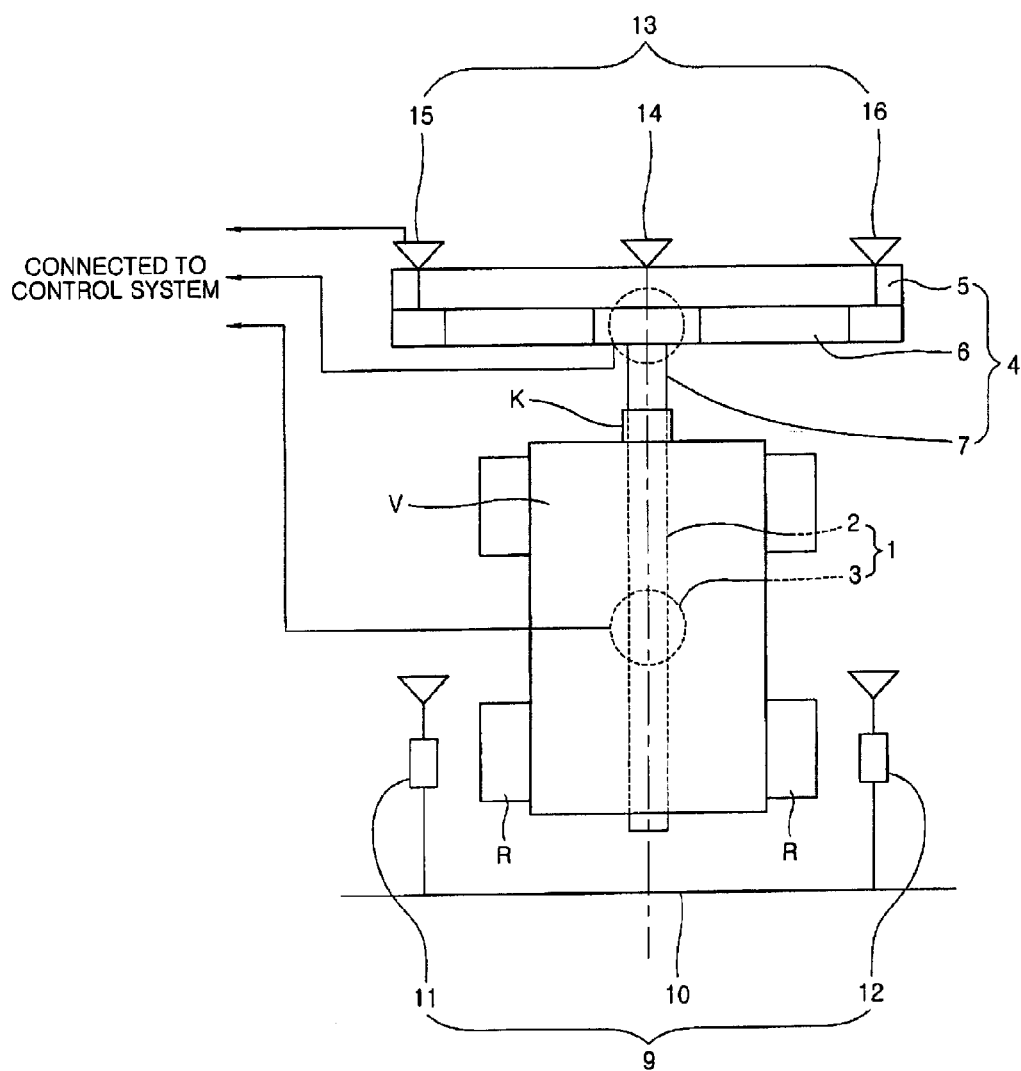
FIG. 1 is a plan view showing the configuration of an apparatus for alignment adjustment of a radar equipped in a vehicle, using RF, according to a first embodiment of the invention.

Referring to FIG. 1, a first exemplary apparatus for alignment adjustment of a radar equipped in a vehicle includes a vehicle turning system 1 on which a vehicle V with a radar device K mounted on the front is provided. The turning system 1 turns vehicle V. A vehicle moving system 4 is located in front of vehicle V and horizontally moves vehicle turning system 1. An RF transmitting system 9 is located behind vehicle V and generates RF signals after detecting the locations of the rear wheels R of vehicle V. An RF receiving system 13 is located in front of vehicle V and receives signals from RF transmitting system 9. A control system estimates the vehicle's orientation from the RF signal information and controls the systems to turn and horizontally move the vehicle V on the basis of the information. The control system may include, for example and without limitation, a PLC (Programmable Ladder logic Control system) or a computer. The apparatus may further include a laser, which emits a laser beam to radar device K.

Vehicle turning system 1 includes a vehicle support rail 2 disposed along the longitudinal direction of vehicle V to support the bottom chassis, and a vehicle turning unit 3 that turns vehicle V while the bottom chassis of vehicle V is supported on vehicle support rail 2. Vehicle turning unit 3 may be, for example, a turntable that is turned by driving force transmitted through gears from a motor. Vehicle support rail 2 and vehicle turning unit 3 support the bottom chassis of vehicle V, using, for example, a clamp or a hook.

Vehicle moving system 4 includes a support frame 5 that is disposed horizontally in front of vehicle V, a horizontal guide rail 6 that is disposed in the longitudinal direction of support frame 5 and connected to the ends of support frame 5, and a horizontal mover 7 that has a motor for moving vehicle support rail 2 along horizontal guide rail 6 to move vehicle V horizontally. Horizontal mover 7 is connected to an end of vehicle support rail 2, and converts the driving force of the motor into linear motion. It may have a rack and pinion configuration. The motors for vehicle turning unit 3 and vehicle moving system 4 may be step motors.

RF transmitting system 9 includes left and right RF transmitters 11, 12 that measure the locations of both rear wheels R of vehicle V, and generate RF signals corresponding thereto. Left and right RF transmitters 11, 12 inform the control system whether the front of vehicle V is directed at the front area. An interval-regulating rail 10 regulates the distance between the left and right RF transmitters 11, 12 by moving the transmitters 11, 12.

Alternatively, RF transmitting system 9 may be operable without interval-regulating rail 10, for example, left and right RF transmitters 11, 12 may be mounted directly on the rear wheels R.

RF receiving system 13 includes a central RF receiver 14 that is mounted at the center of support frame 5 in front of vehicle V and left and right RF receivers 15, 16, each mounted at one sides of support frame 5.

Receivers 14, 15, 16, receive signals from left and right RF transmitters 11, 12. Specifically, central RF receiver 14 and left RF receiver 15 receive signals from left RF transmitter 11 and central RF receiver 14, and right RF receiver 16 receive signals from right RF transmitter 12.

Figure 4:
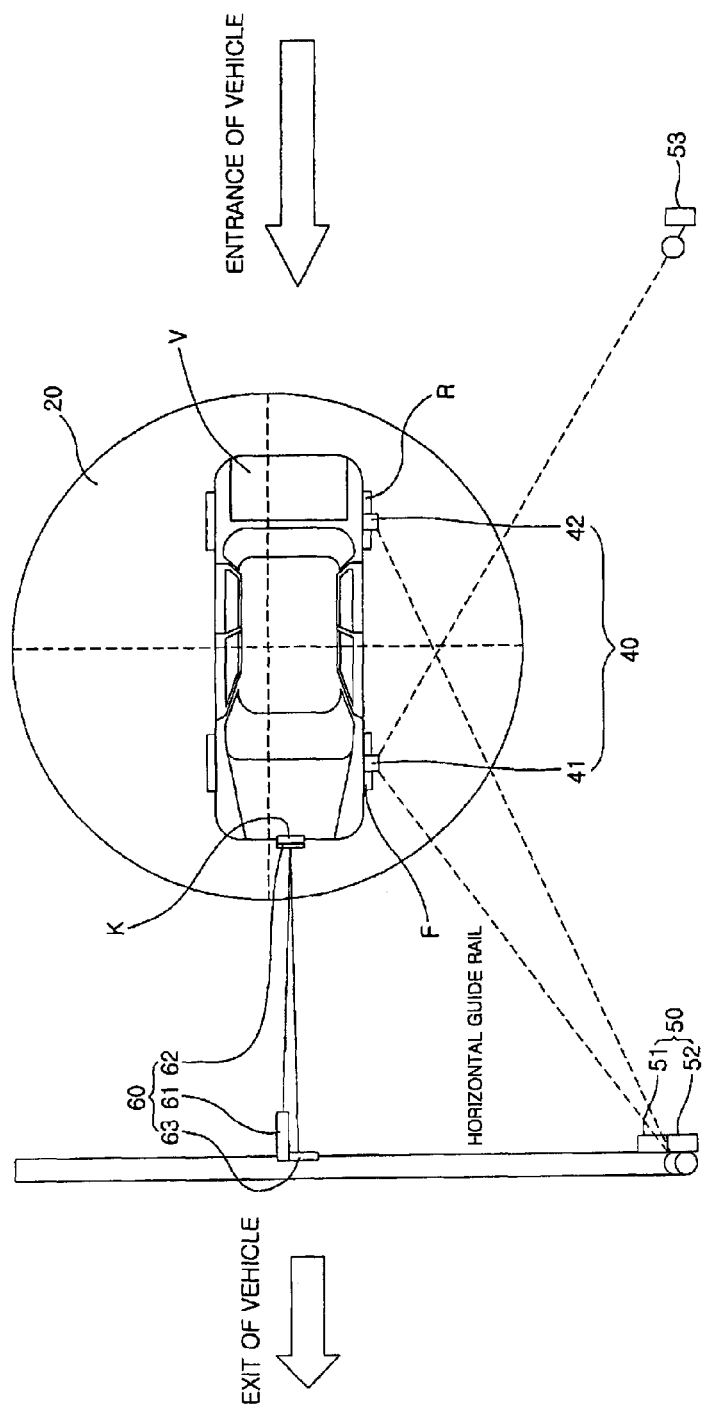
FIG. 4 is a plan view showing the configuration of an apparatus for alignment adjustment of a radar equipped in a vehicle, using ultrasonic waves, according to a second embodiment of the invention.

Alternatively, the invention may use ultrasonic waves, instead of RF signals. Specifically, as shown in FIG. 4, an apparatus for alignment adjustment of radar equipped in a vehicle using ultrasonic waves includes a vehicle turning system 20, on which vehicle V with radar device K mounted on the front is provided and that turns vehicle V, a laser system 60 mounted on a horizontal guide rail 30 in front of vehicle V that examines whether a laser beam radiated to the front aligns with the center line of vehicle V, a orientation detecting system that informs a control system about the amount of turning of vehicle V relative to the center line on the basis of ultrasonic waves generated by ultrasonic wave sensors mounted at front wheel F and rear wheel R, and a control system that determines the orientation of vehicle V from the ultrasonic signals and controls the other systems and turns vehicle V based on the determined orientation. The control system may include, for example, a PLC (Programmable Ladder logic Control system) or a computer.

Vehicle turning system 20 may be, for example, a turntable that is turned by driving force transmitted through gears from a motor. Further, vehicle turning system 20 can be varied in height using, for example, a screw shaft or rack and pinion.

Laser system 60 includes a laser 61 that emits a laser beam to its front area, a mirror 62 that is attached to the front side of the radar device K of vehicle V, and a target plate 63 that receives the laser beam reflected from mirror 62.

When the center line of vehicle V aligns with laser 61, it means alignment adjustment of radar K is completed.

The orientation detecting system includes an ultrasonic wave transceiver 40 composed of first and second ultrasonic wave sensors 41, 42 that are attached to front wheel F and rear wheel R, respectively, and generate ultrasonic waves, and an ultrasonic reflector 50 that ultrasonic waves from first and second ultrasonic wave sensors 41, 42 reflect off.

Ultrasonic reflector 50 includes first, second, and third reflective plates 51, 52, 53 so that the transmitting/receiving distances from ultrasonic sensors 41, 42 to reflective plates 51, 52, 53 can be calculated. For example, first and second reflective plates 51, 52 are located at the same horizontal location in FIG. 5 such that they reflect ultrasonic waves from first and second ultrasonic wave sensors 41, 42, respectively, whereas third reflective plate 53 is located at a predetermined horizontal distance from first and second reflective plates 51, 52 to reflect ultrasonic waves from first ultrasonic sensor 41.

The operation of exemplary embodiments will now be described with reference to the accompanying drawings.

When aligning radar K for ACC (Adaptive Cruise Control) or CDM (Chassis Dynamometer) with the center line of vehicle V, using RF signals or ultrasonic wave signals, the central axis of a laser beam is aligned with the center line of vehicle V, and the alignment is adjusted without expensive and specialized equipment.

Figure 2:
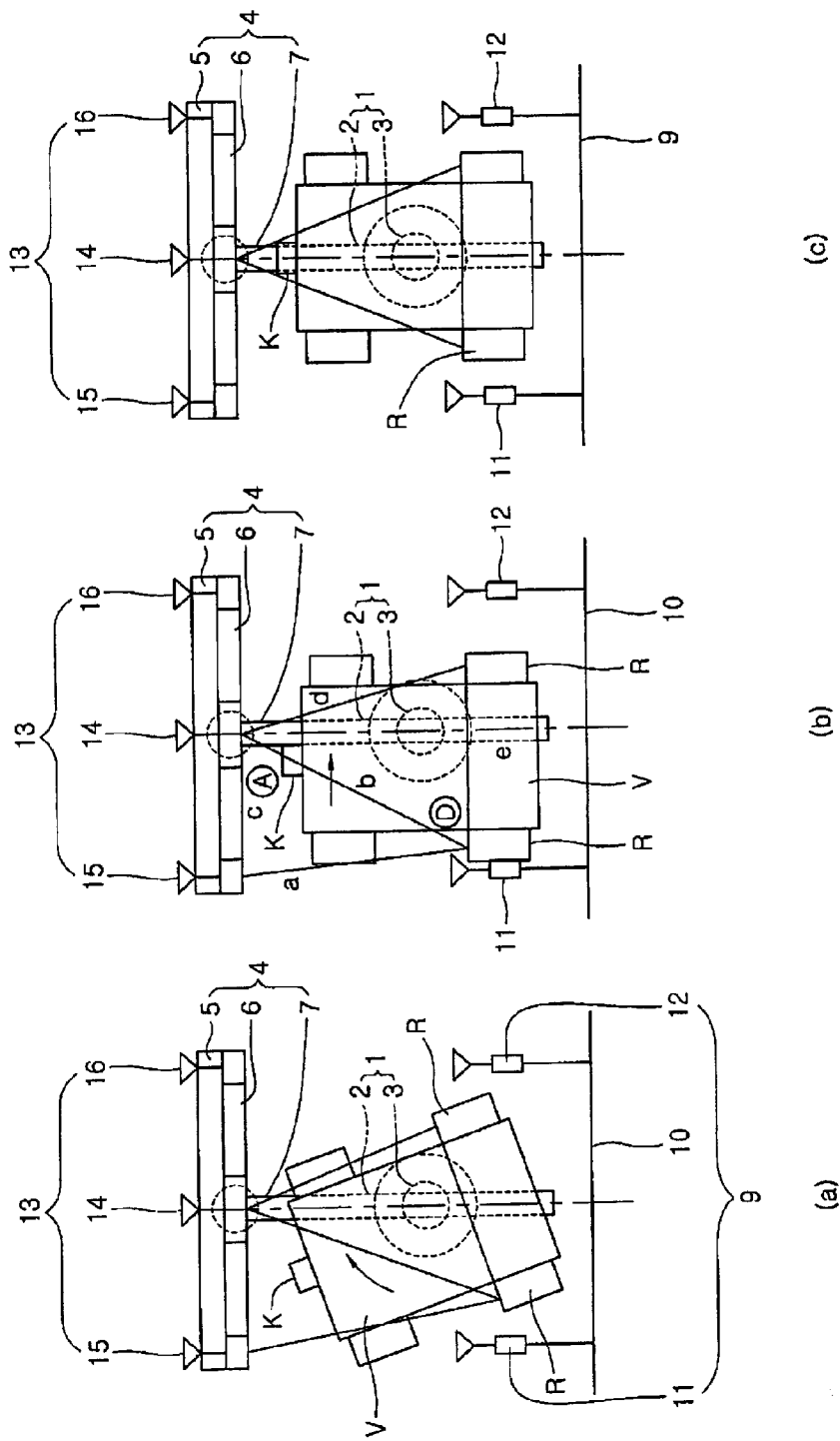
FIGS. 2A to 2C illustrate the operation of the apparatus of FIG. 1.
Figure 3:
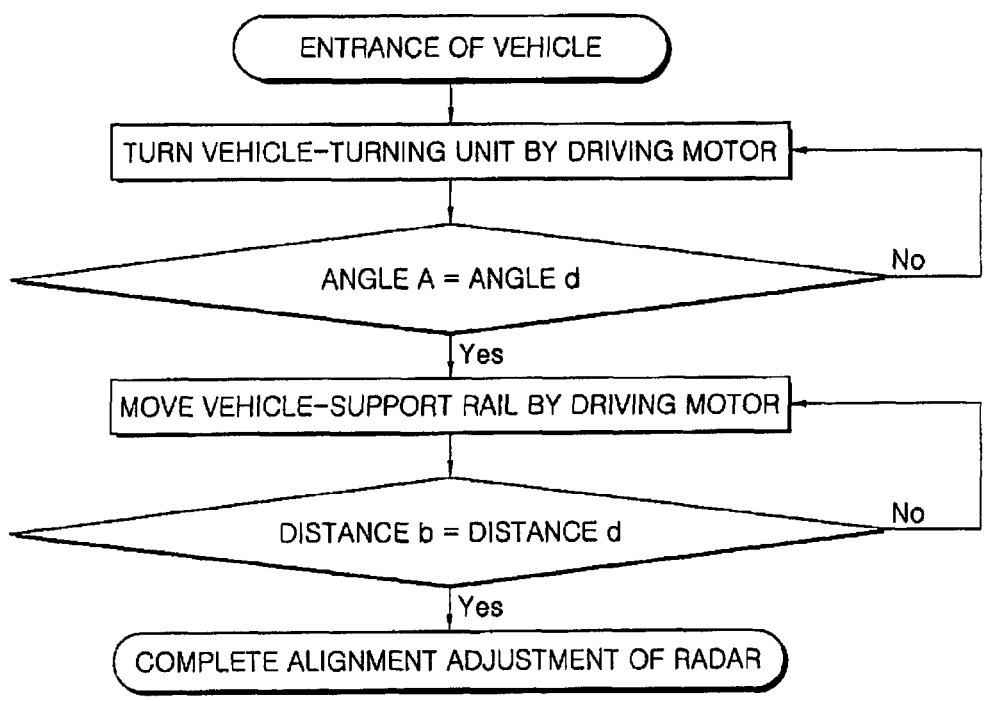
FIG. 3 is a flowchart illustrating the operation of the apparatus of FIG. 1.

As shown in FIGS. 2A, 2B, and 2C, in the first exemplary embodiment, the orientation of vehicle V is detected by RF after the vehicle is located on vehicle turning system 1. In detecting the orientation, left and right transmitters 11, 12 of RF transmitting system 9 first generate RF signals for the positions of both rear wheels R.

The RF signals from left and right RF transmitter 11, 12 are transmitted to a pair of central RF receivers 14 mounted on support frame 5 in front of vehicle V, and to left and right RF receivers 15, 16 mounted at both sides of support frame 5. Specifically, central RF receiver 14 and left RF receiver 15 receive the signals from left RF transmitter 11, and central RF receiver 14 and right RF receiver 16 receive the signals from right RF receiver 12.

Next, information on the left side of vehicle V detected by left RF transmitter 11, central RF receiver 14, and left RF receiver 15, and information on the right side of vehicle V detected by right RF transmitter 12, central RF receiver 14, and right RF receiver 16, is transmitted to the control system. The control system, having received the information, recognizes the orientation of vehicle V, for example the orientation shown in FIG. 2A, by analyzing the information and then starts to move vehicle V.

As shown in FIG. 2B, first, in order to align vehicle V, the step motor is driven, turning vehicle turning unit 3 which turns the vehicle V to be aligned straight.

The amount of turning of vehicle turning unit 3 is controlled by the control system. As shown in FIG. 2B, vehicle turning unit 3 may be turned until angels A and D are equal.

Since angles A and D are not measured directly, this may be calculated through the following equation expressed by reference characters a, b, c, d, e, A, and D represented in FIG. 2B, derived from the law of cosines and the cosine half-angle formula:

$$\cos\left(\frac{A}{2}\right) = \sqrt{\frac{S_1(S_1 - a)}{bc}} = \cos\left(\frac{D}{2}\right) = \sqrt{\frac{S_2(S_2 - d)}{be}}$$

where $S_1 = \frac{a+b+c}{2}$ and $S_2 = \frac{b+d+e}{2}$

After vehicle V is aligned with the straight line, as shown in FIG. 2B, left and right transmitters 11, 12 of RF transmitting system 9 generate again RF signals for positions of both rear wheels R, behind vehicle V. The control system, which has received the RF signals, estimates the amount of straying of the center line of vehicle V, and then starts to drive the motor in horizontal mover 7.

As the motor is driven, horizontal mover 7 moves vehicle support rail 2 along horizontal guide rail 6. The vehicle support rail 2, in turn, moves vehicle V.

The center line of vehicle V, as shown in FIG. 2C, moves until distances b, d from the center line to the rear wheels R of vehicle V are equal.

When the center line of vehicle V is located at a desired position, it is examined whether radar device K attached to the front of vehicle V aligns with the center line. The examination requires laser 60 shown in FIG. 4, which illustrates the second exemplary embodiment, thus will be described in detail below with reference to the second embodiment.

Figure 6:
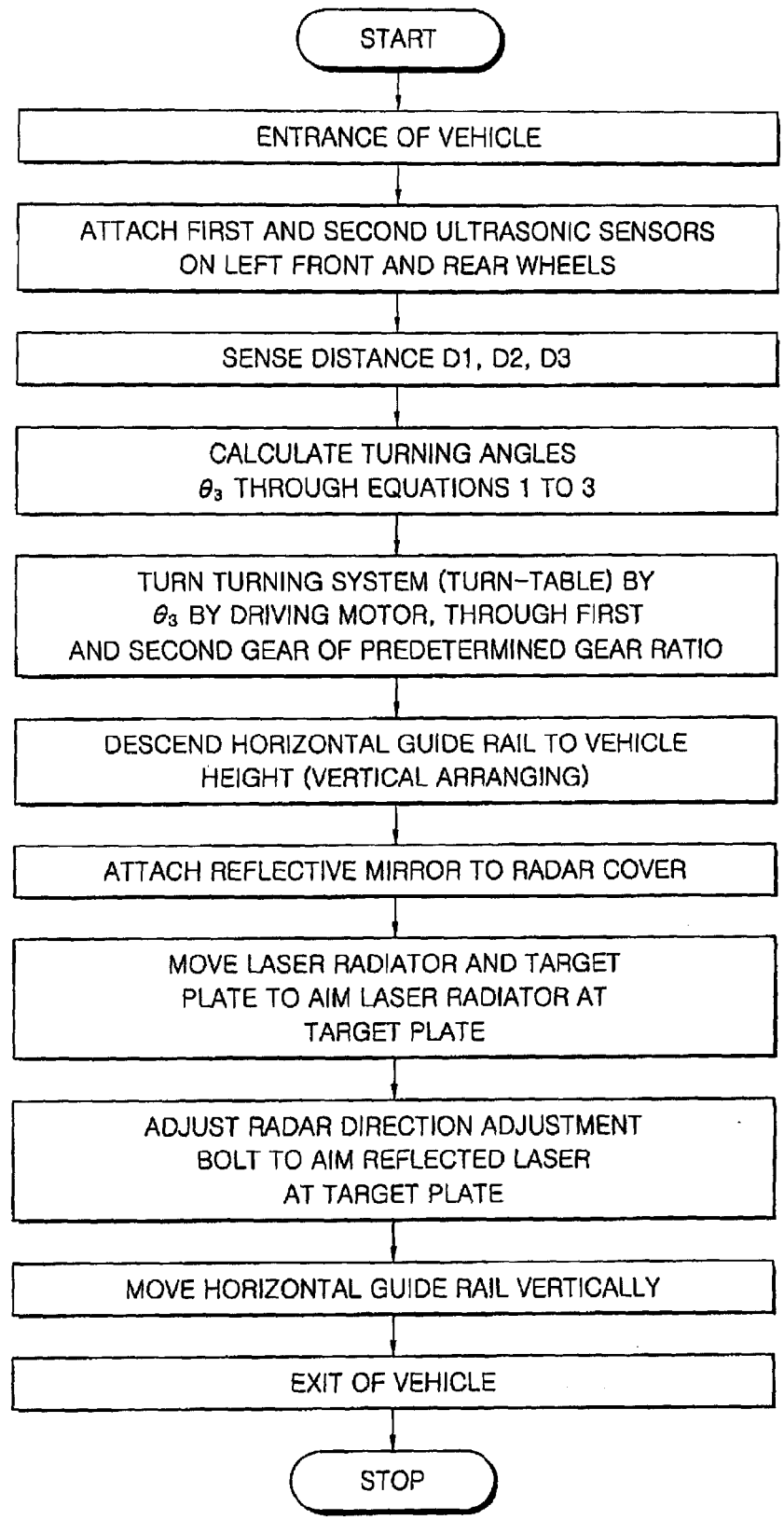
FIG. 6 is a flowchart illustrating the operation of the apparatus of FIG. 4.

In an apparatus for alignment adjustment of a radar equipped in a vehicle, using ultrasonic waves, according to the second exemplary embodiment, as shown in FIG. 6, when vehicle V is located on vehicle turning system 20, first and second ultrasonic sensors 41, 42 are attached to front wheel F and rear wheel R, respectively. Subsequently, the orientation of vehicle V is detected by first, second, and third reflective plates 51, 52, 53 that reflect ultrasonic waves generated from first and second ultrasonic sensor 41, 42.

Figure 5:
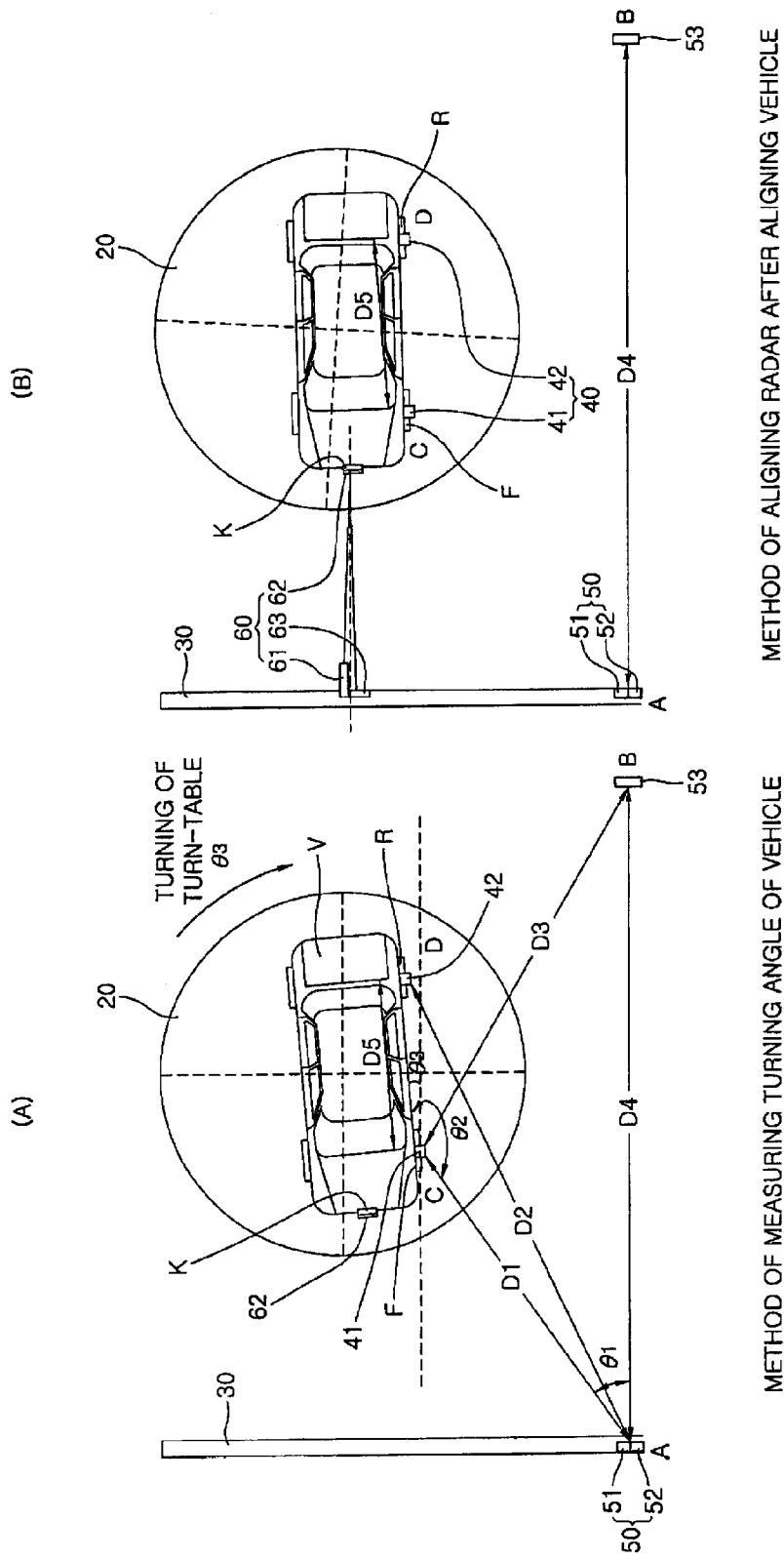
FIGS. 5A and 5B illustrate the operation of the apparatus of FIG. 4.

As shown in FIG. 5, on the basis of the orientation of turned vehicle V, signals transmitted from first and second ultrasonic wave sensors 41, 42 to first and second reflective plates 51, 52 return to the sensors 41, 42, and the signal to third reflective plate 53 returns to first ultrasonic wave sensor 41. The amount of turning of vehicle V is estimated from the above configuration.

This may be calculated through the following equations expressed by reference characters represented in FIG. 5A:

$$\text{in} \Delta ABC, \cos\theta_1 = \frac{D_1^2 + D_4^2 - D_3^2}{2 \times D_1 \times D_4} \quad \text{eq. (1)}$$

$$\text{in} \Delta CAD, \cos\theta_2 = \frac{D_1^2 + D_5^2 - D_2^2}{2 \times D_1 \times D_5} \quad \text{eq. (2)}$$

$$\theta_3 = \theta_2 - (180° - \theta_1) \quad \text{eq. (3)}$$

After determining the orientation of vehicle V from the above equations, using transceiver 40 and ultrasonic wave reflector 50, the control system drives the motor to turn vehicle turning system 20, turning vehicle V, as shown in FIG. 5B.

After turning vehicle V, as shown in FIG. 5B, radar device K equipped in vehicle V is aligned with the center line of vehicle V. To align radar device K, laser 61 emits a laser beam to the front of radar device K and it is determined whether proper alignment has been achieved, on the basis of the position on target plate 63 where the laser beam reflected from mirror 62 reaches.

If the reflected laser beam does not reach the center of target plate 63, radar K is adjusted, and which is repeated until the laser beam is centered on target plate 63 after being reflected from mirror 62.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus, comprising:
    a vehicle turning system comprising a vehicle support rail configured to support a vehicle, and a vehicle turning unit configured to rotate the vehicle;
    a vehicle moving system comprising a support frame, a guide rail connected to the support frame, and a mover configured to move the vehicle support rail and the vehicle along the guide rail;
    a signal transmitting system comprising first and second transmitters that measure locations of first and second portions of the vehicle, respectively, and generate signals corresponding to the positions, and an interval-regulating rail configured to regulate a distance between the first and second transmitters;
    a signal receiving system comprising a central receiver mounted on the support frame and first and second receivers mounted on the support frame at first and second sides of the central receiver, respectively; and
    a control system that estimates an orientation of the vehicle based on the signals and controls the vehicle moving system and vehicle turning system to move the vehicle on the basis of the orientation.

2. The apparatus as set forth in claim 1, wherein the central receiver and the first receiver receive the signals from the first transmitter, and the central receiver and the second receiver receive the signals from the second transmitter.

3. An apparatus, comprising:
    a vehicle turning system configured to rotate a vehicle disposed thereon;
    a laser system comprising a laser configured to emit a laser beam, a mirror configured to be attached to the vehicle, and a target plate configured to receive the laser beam from the mirror;
    an orientation detecting system comprising a transceiver comprising first and second sensors that are attached to first and second portions of the vehicle, respectively, and generate signals, and a reflector that reflects the signals; and
    a control system, configured to receive the signals from the orientation detecting system, to determine an orientation of the vehicle based on the signals, and to control the vehicle turning system based on the orientation.

4. The apparatus as set forth in claim 3, wherein the reflector comprises first and second reflective plates configured to reflect the signals from the first and second sensors, respectively, and a third reflective plate configured to reflect the signal from the first sensor.

* * * * *